C. C. Hare,
Sad Iron,

No. 67,979.  Patented Aug. 20, 1867.

Witnesses.

Inventor.
C. C. Hare
Per Munn & Co.
Attorneys

United States Patent Office.

C. C. HARE, OF LOUISVILLE, KENTUCKY.

Letters Patent No. 67,979, dated August 20, 1867.

IMPROVED SAD-IRON.

The Schedule referred to in these Letters Patent and making part of the same.

TO ALL WHOM IT MAY CONCERN:

Be it known that I, C. C. HARE, of Louisville, in the county of Jefferson, and State of Kentucky, have invented a new and useful Improvement in Sad-Irons; and I do hereby declare that the following is a full, clear, and exact description thereof, which will enable others skilled in the art to make and use the same, reference being had to the accompanying drawings, forming part of this specification.

This invention relates to an improvement in sad-irons, and consists in a sad-iron having a detachable handle. In the accompanying drawings—

Figure 1:
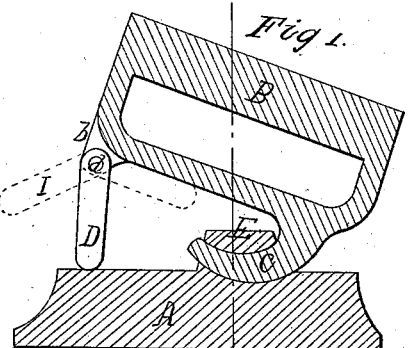

Figure 1 is a vertical longitudinal section of my improved sad-iron, and

Figure 2:
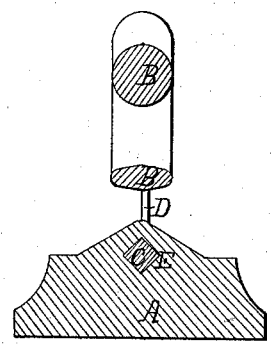

Figure 2 a vertical section thereof at line $x\ x$.

Figure 3:
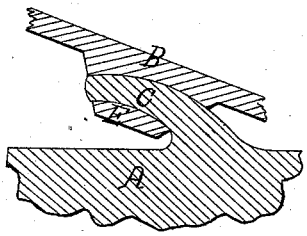

Figure 3 shows an alternative arrangement of the connecting shank.

Similar letters of reference indicate like parts.

A is the sad-iron, B the handle, C the connecting shank, E the socket corresponding in shape to the shank $c$; D, a bar or brace hinged at $d$ to the projecting ear $b$. To remove the handle, the brace D is lifted into the position shown by the dotted lines 1, fig. 1, when the shank C can be at once removed from the socket E, and the iron being heated without heating the handle, the latter is then attached to the former by passing the connecting shank C through the socket E, and bolting it in place by dropping the brace D. Fig. 3 exhibits an alternative arrangement, in which the socket is attached to the handle and the connecting shank to the iron; but I prefer to use the arrangement shown in figs. 1 and 2.

Having thus described my invention, what I claim as new, and desire to secure by Letters Patent, is—

1. The handle B, provided with the curved shank C and pivoted brace D, in combination with the curved socket E, upon the iron A, substantially as described, for the purpose specified.

2. The iron A and handle B, fitted together by means of the shank C upon the latter fitting into the socket E of the former, or the shank C upon the former fitting into the socket E of the latter, retained in position or released by means of the pivoted brace D, substantially as described for the purpose specified.

C. C. HARE.

Witnesses:
    S. B. HART,
    S. J. HARE.